US008918851B1

(12) United States Patent
Iannamico

(10) Patent No.: US 8,918,851 B1
(45) Date of Patent: Dec. 23, 2014

(54) JUXTAPOSITIONAL IMAGE BASED AUTHENTICATION SYSTEM AND APPARATUS

(71) Applicant: Michael John Iannamico, Fremont, CA (US)

(72) Inventor: Michael John Iannamico, Fremont, CA (US)

(73) Assignee: Michael Iannamico, Fremont, CA (US)

( * ) Notice: Subject to any disclaimer, the term of this patent is extended or adjusted under 35 U.S.C. 154(b) by 10 days.

(21) Appl. No.: 13/951,482

(22) Filed: Jul. 26, 2013

(51) Int. Cl.
*G06F 7/04* (2006.01)
*G06F 15/16* (2006.01)
*G06F 17/30* (2006.01)
*H04L 29/06* (2006.01)
*G06F 21/36* (2013.01)

(52) U.S. Cl.
CPC .................................. *G06F 21/36* (2013.01)
USPC ............................................................ 726/7

(58) Field of Classification Search
CPC ...................................................... G06F 21/36
USPC ............................................................. 726/7
See application file for complete search history.

(56) References Cited

U.S. PATENT DOCUMENTS

| | | | | | |
|---|---|---|---|---|---|
| 5,729,471 | A | * | 3/1998 | Jain et al. | 725/131 |
| 5,987,136 | A | * | 11/1999 | Schipper et al. | 713/176 |
| 2004/0230843 | A1 | * | 11/2004 | Jansen | 713/202 |

* cited by examiner

*Primary Examiner* — Dant Shaifer Harriman

(57) ABSTRACT

An authentication system is presented that relies on an arrangement of positions defined through a positional matrix to determine the order in which two or more sets of images are extracted from a file structure and presented to a user through the mutually parallel rows or columns of a selection mechanism during the administration of an authentication challenge and which then attempts to authenticate the user's right of access or verify their identity based on the representational positions and relative alignment of the images matched by the user in some prescribed manner through the selection mechanism thus allowing the system to perform its authentication functions without having to explicitly reference, process, transmit or store any specific image identifiers, display coordinates or file designators that could, if otherwise compromised, reveal the proprietary images chosen by the user for the purpose of their authentication.

19 Claims, 7 Drawing Sheets

Schematic of Juxtapositional Authentication Logic

Positional Matrices with Shuffle Formula Applied

Image Extraction and Presentation Method

Example of a Selection Dial

Example of Comparator Mechanism

JUXTAPOSITIONAL IMAGE BASED AUTHENTICATION SYSTEM AND APPARATUS

FIELD OF THE INVENTION

The present invention relates to the implementation of an authentication access system and apparatus that, rather than requiring a user to enter a traditional password or pin number, relies instead on an arrangement of positions defined through a positional matrix to determine the order in which two or more sets of images are presented to the user through the mutually parallel rows or columns of a selection mechanism during the administration of an authentication challenge and that enables the user to validate their right of access or verify their identity by matching or aligning the images from one set of images with those of another in some prescribed manner thus allowing the authentication system to track the user's selection of images and perform its authentication functions based on the representational positions associated with the images without having to explicitly reference, process, transmit or store any specific image identifiers, screen coordinates or file designators that, if compromised, could otherwise reveal the proprietary images choosen by the user for the purpose of their authenticaiton.

BACKGROUND OF THE INVENTION

From the earliest known times, humans have continuously striven to devise ever more sophisticated and foolproof ways of establishing and authenticating the authority of a given individual to access the environments and assets to which they are rightfully entitled. Every form of the art that attempts to grant the right of an individual to access a particular environment or asset relies on one or more of the following well known factors used to authenticate their authority to do so.

Something only the rightful individual possesses such as a key, an ID card, a credit card, or a badge.

Something only the rightful individual can exhibit as a uniquely identifying biometric characteristic such as their facial features when compared with a photograph, a voiceprint, fingerprint or the distinctive variations in the iris of their eye.

Something only the rightful individual knows like the numbers to a combination lock, a PIN number, an access code, a secret password or the correct answer to a confidential security question.

There have been steady advancements in the technologies used to verify an individual's identity through something only they posses which could well soon see the citizens of many countries issued a smart ID card or perhaps someday even be implanted with a radio frequency chip, though the later will likely concern those who do not believe the convenience of instant identification is worth the loss of privacy in conducting their every day affairs. In a similar manner, the field of biometrics has continuously yielded new techniques for establishing someone's identity by the distinctive ridges in their fingerprint, subtle variations in the sound of their voice or even through facial recognition programs that can now identity someone by their image caught on a video camera though these solutions are expensive and can be fooled, and once a biometric identifier has been compromised, there is no way to change it.

While relying on something only an authorized person would know is still the most effective and least complicated way to restrict access to a secured environment or protected asset, we are still using the same archaic password and PIN based authentication systems that were used in the days when punch cards were required to operate mainframe computers. Unfortunately, alphanumeric based password and PIN systems remain the most widely deployed methods for verifying a user's right of access or identification even though they are universally regarded as increasingly inadequate for protecting access to the pervasive computing environments and electronically guarded assets of today's modern world which are coming under increasing sophisticated forms of attack.

The numerous problems associated with traditional password and PIN based authentication systems and methods designed to address their vulnerabilities are well known and have been extensively elaborated upon by many recognized experts in widely circulated publications, open forums and by the authors of many prior forms of the art and so are only briefly summarized in this background discussion.

One of the major problems with traditional password systems is that the responsibility of formulating an effective password is generally left to the discretion of the user who is faced with the dilemma of choosing something that is easy for them to remember but that is sufficiently complex to resist being compromised by ever evolving and resourceful assaults designed to perpetrate their discovery. When left to their own inclination, most users tend to choose simple passwords that have some personal relevance, are easy to remember and that can be typed in quickly which are precisely the kinds of passwords that are easy to guess or figure out using any number of techniques that have been devised specifically for this purpose over the years. As a result, most password authentication systems have had to enact more stringent policies that set a minimum length, require a specific mix of alpha and numeric characters or even mandate that the passwords be changed on a regular basis thus making it much harder for users to choose something that they can remember or that they can type in quickly and easily without mistakes.

To further compound the problem, as an increasing percentage of every day business and commerce such as work-related telecommuting, financial transactions, shopping and interaction through social networks is conducted on-line, users are required to maintain many different passwords making them unwieldy to manage and leading to a variety of unsafe password handling practices. In an attempt to keep track of all their passwords and avoid the possibility of being denied access to a resource or asset when needed, many users carelessly record their passwords somewhere, turn to programs that manage all their passwords from a central repository or simply resort to using the same password over and over again; all of which just increases the probability of discovery and ultimately compromises the security for all the sites and assets they access. The difficulty users have in remembering their passwords is so endemic that every on-line environment provides an option on their login page that allows users to submit a request to have their password sent via email provided that they are able to answer some previously agreed upon personal question which essentially just bypasses the whole password process altogether and leaves the entire security of the account hinged on a multiple choice question regarding someone's favorite movie or type of pet.

Even when all the correct password security policies are implemented and the safest possible practices are literally followed to the letter, passwords are still inherently insecure and can easily be intercepted by key logging programs that capture the password as they are being typed, through "man in the middle" and "phishing" attacks that trick users into revealing their passwords using fake login pages or even by simple over the shoulder observation or video monitoring.

Beside the vulnerability of being captured while being entered by the user, the passwords (or a hashed representation) must be stored somewhere and are often transmitted across the network so, even though this information is usually encrypted, it can easily falls prey to hackers who use sniffing programs to capture the information during transmission or access the databases where it is stored and then use brute force techniques such as "dictionary attacks" to discover the secret information. Finally, all password systems require that the user reveal their secret information to the system, even when it is just used to generate a key, so anyone who administers the system or has access to its inner workings can potentially gain access to a users sensitive information or protected assets and, considering that many people use the same password to access all of their accounts, once one is compromised so are all the others.

In recent years, there have been numerous attempts to replace the antiquated password authentication system with more visual oriented alternatives that rely on the recognition of images or, the selection of visual elements within an image, rather than on the recollection of words and numbers as the means for administering an effective authentication challenge. While these visual based authentication systems are unquestionably easier to use, have been proven to be just a secure as traditional passwords, and are not rendered ineffectual by the forgetfulness of ordinary users when it comes to remembering their secret information, security concerns and other implementation considerations have hampered any visual based authentications systems from gaining widespread adoption. One weakness of previous forms of the art is that unlike the unlimited combination of characters that remain privy to the user until entered in the form of a password, only a finite combination of images can be used in an image based system and these images must be stored and referenced in some way by the system and then openly presented to the user for selection. This has left previous graphic based authentication system vulnerable to attacks designed to discover the user's secret information by observing their on-screen selections, analyzing how the images or screen positions are addressed by the application or capturing the information associated with the user's selection of images as it is transmitted or stored by the system.

Although the use of passwords and PIN numbers currently remains the pervasive solution for protecting access to computing devices, on-line environments and physical assets, the system being proposed provides a convenient and effective alternative by utilizing an image-based authentication challenge that relies on a user's recognition of a series of images rather than on their short-lived recollection of some complicated series of characters or numbers. Studies have shown that people have an innate ability to retain a lasting contextual memory of the images they visualize as is clearly demonstrated by the average computer user who, even after a substantial period of disuse, is able to sift through a screen full of images and click precisely on the icons and symbols that are required to complete their everyday computing chores. Further studies have made a strong case that graphic based authentication systems are not only easier to use from the user's perspective but can be administered much more efficiently and are considered by many experts to be an equally effective, if not a stronger form of authentication, than traditional password and PIN based systems, especially given that they cannot be determined through brute-force dictionary attacks.

There have been attempts by prior forms of the art to design graphical based authentication systems that require users to select images, or click on some portion of an image in a possibly predefined manner to authenticate their right of access, but none have garnered any widespread acceptance for various reasons, not the least of which has been concerns regarding their inherent vulnerability. Although it is easier for a user to recall an image, particularly when given a selection of possible choices as opposed to having to remember a password entirely from memory, there are an unlimited number of unique password variations to draw upon and they are only exposed at the time the characters are entered by the user to gain access, whereas an image based system must rely on a finite selection of image choices that have to be stored, addressed and then displayed in plain sight where the potential for exposure and discovery at some point in the process is much more likely. This inherent weakness has rendered previous graphic based authentication systems vulnerable to attacks designed to discover the user's secret information by observing their on-screen selections, analyzing how the images or screen positions are addressed by the application or capturing compromising information regarding the image selections as it is processed, transmitted or stored by the system.

The invention being proposed is designed to incorporate the ease of use benefits of a graphic based authentication system while attempting to overcome the security pitfalls and administrative overhead of previous forms of the art. Towards this endeavor, the system incorporates a number of design innovations that make it much more impervious to attacks designed to ascertain which images are being chosen by monitoring of a user's on-screen selections or through any reasonably foreseeable method of discovery based on the tangential information that is referenced, exchanged or stored by the system in the course of performing its authentication functions.

Following are some of the design advantages that this authentication system offers over prior forms of the art:

Provides a graphic based authentication system that can be accessed ubiquitously from a wide variety of different devices since the presentation and selection of images are not tied to the addressing of any set display coordinates and is easily operated through a single motion control without requiring the use of a cumbersome keyboard or pointing device.

Administers an authentication challenge and tracks the user's responses through positional and relational coordinates that are correlated with the images through a positional matrix that allows the system to present and track the selection of images without addressing or storing any directly identifying references to the actual images themselves thus addressing a vulnerability that could be exploited in previous forms of the art to determine which images are being selected to gain admittance to a given environment or resource.

Implements a one-time challenge mechanism that avoids the necessity of pass code generators, and the attendant infrastructure required to administer previous one-time password or PIN based authentications, by simply shuffling the order in which the images are presented and the manner in which they must be matched by the user from one authentication session to next which effectively eliminates the possibility of phishing or man-in-the middle schemes that have been so effective in circumventing the security of previous forms of the art.

Conceals the correlation between the image positions that are used by the system to perform its authentication functions and the images that are presented to the user by relying on the order in which the images are arranged and sequence with which they are extracted from the file structure where they are stored, rather than through any direct addressing that could be revealed by examining the processing of the application code, thus allowing the images to be securely stored on the device being used to administer the authentication challenge where they can be quickly accessed for presentation and selection by the user.

Shields a user's selection of images from detection during the authentication challenge by relying on the matching or correlation of one of the secret images with another rather than through the direct entry of an easily observable password or the identification of an image through a fixed selection point that could have heretofore been discovered through key logging programs, on-screen monitoring, or over the shoulder observation.

Eliminates the administrative overhead and inconvenience of having users change their secret information on a routine basis, as is currently required by most other forms of the art to reduce the risk of discovery when using the same password or selection of images over an extended period of time, since it is not just the selection of an image, but the combination in which the images must be matched that governs a users right of access, and this is altered for each authentication session through the shuffle formula and one-time challenge mechanism.

Affords users the convenient option of using the same selection of images for all the environments or assets they access without having to worry, as would be the case with other forms of the art, that the exposure of their password or selection of images at one site might compromise their access elsewhere since each implementation of the system uses its own unique assignment of image positions to perform its authentication functions without referencing, storing or even being aware of the actual images that are being chosen by a given user to gain admittance.

Increases the number of challenges that can be administered from the base set of images since the matching of images is used as the means of selection, thus allowing a much higher level of security to be implemented for verification purposes that would otherwise be possible with other forms of the art by simply altering the combination of images that are presented for selection by the user during any given authentication session.

Obscures a user's selection of images from exposure during the authentication challenge by simultaneously displaying all the available image choices for two or more sets of images and then relying on the concurrent matching of decoy images that are tangentially aligned to camouflage the selection of images that are actually being used to gain admittance.

Protects the user's selection of images from being captured as they are processed by the system or transmitted over the network for verification by using a positional offset between the alignment of the rows of images as matched by the user to calculate what images are being selected rather than relying on any direct reference to the actual images that could potentially compromise the security of the system as is the case with other forms of the art.

Safeguards any records of a user's selection of images that are used to verify their authority to access a given environment or asset by only processing and storing positional mappings that are correlated with image selections rather than through any directly revealing references of the images themselves that could have heretofore been determined by hacking the database where this information is stored.

SUMMARY OF THE INVENTION

The authentication system being described protects access to computing devices, on-line environments and even physical assets based on a user's selection and subsequent ability to correctly identify a series of familiar and easy to recall images. One of the goals of this invention is to solve the problem of having to select and remember the complicated amalgamation of characters and numbers that are required to comply with ever more stringent password policies by relying instead on the innate ability of most people to readily recognize and retain a more indelible memory of the images they see. However, implementing a graphic based authentication system rather than one that utilizes traditional passwords provides other design advantages as well, particularly in the efficiency with which the authentication challenge can be administered and in the way the secret information used to verify a user's right of access or identification can be safeguarded from discovery by an interloper.

The preeminent innovation in the design of this authentication system has been in devising a means of presenting a set of images and then verifying whether the user has correctly identified the images required to authenticate their right of access based entirely on positional and relational coordinates that are correlated with the images in a way that allows the system to perform its authentication functions without revealing, or even having to know, what specific images are being manipulated. By avoiding the direct referencing of images through any explicit identifier or screen position, this approach makes it infinitely more difficult for anyone to figure out which images are being used to gain admittance to a protected environment or asset by observing their placement or selection on the screen, examining the processing of program instructions or accessing any information that is exchanged or stored by the system.

The primary mechanism for defining the correlation between a set of images and the positions with which they are associated is achieved through a correspondence with their coordinates in a positional matrix. When a user requests access to a computing environment, a physical asset, or to otherwise establish their identity, the client submits the request to the authentication server which generates instructions for creating the positional matrix. The client uses the resulting arrangement of positions in its version of the matrix to determine the order in which to extract the appropriate images and present them for selection by the user through the selection mechanism. Using the same instructions, the authentication server relies on the positions in its mirrored version of the positional matrix to determine the order in which the images are being presented for the current session and to subsequently calculate which image positions have been selected by the user. By utilizing the association between the images, and the positional information that is used to represent the images within the matrix, the system can present the images and track their selection without directly referencing the images themselves thus eliminating an area of vulnerability that could potentially be exploited in an attempt to circumvent the security of the system.

Given the inherent weakness of a system where the positions associated with a set of images are statically defined and could possibly be ascertained through repetitive observation, the positional matrix is designed to be reconfigurable through a shuffle formula that defines how the image positions within the matrix are rearranged for each authentication session. A different shuffle formula is assigned to each user during the registration process which serves as a unique authentication profile by ensuring that the initial positional coordinates associated with a set of images are uniquely defined by the server for each individual. As an added measure of security, the shuffle formula is varied each time a user requests access and is then reconciled with the initial shuffle formula assigned during the registration for each user, thereby providing a one-time authentication challenge that changes for each user during every authentication session. The shuffling of images in the matrix not only precludes the knowledge of image positions or selections made in one session from being used to gain access in another but also allows a user to choose the same images for all the resources and assets they access since each maintains its own user profile and relies on its own shuffle formulas and positional coordinates to perform its authentication functions.

To further deter the possibility of someone figuring out which images are being selected by observing how they are referenced by the system for presentation to the user, each set of images are stored as individual frames in an encrypted file structure that is maintained by the client and are extracted according to the sequence with which they are arranged in the structure and, depending on where the extraction point in the sequence is initiated, rather than by any explicit identifier that is addressed by the system. The order in which a given set of images are extracted from the file structure and mapped to their associated positions in the matrix is specified through a predefined image extraction algorithm that is executed from within the file structure according to parameters that are assigned to the user by the server during the registration process and then passed to the client at the start of each authentication session to specify the predetermined manner in which the extraction sequence is applied for that specific user.

Since the order in which the images are extracted is dictated by the extraction parameters and the presentation of the images depends on the order of their shuffled positions in the matrix, even if the contents of the files containing the images are somehow deciphered, the information would be of little use without knowing the order in which the images are assigned for a particular user, especially given that the order in which they are presented is altered for each authentication session. This disassociation between the images and how they are referenced allows a standardized collection of images to be freely distributed to any client where they can be stored locally and quickly referenced and presented to the user from any type of device whether through a web browser or some other proprietary implementation of the client application.

Although the user interface for administering the authentication challenge could be designed in a variety of different ways, the fundamental technique employed in common by any conceivable variation relies on the simultaneous presentation of multiple sets of images that can be moved in parallel with relation to one another and where an image in one set is matched or correlated in some manner with an image in another set as the means of selecting and identifying the correct images required to gain admittance. In the current embodiment, the images are presented through a "selection dial" consisting of counter revolving rows of images that the user rotates to select the images used to verify their right of access or identification by matching one of the selected images in one row of the dial with another image in the other row.

The user is required to rotate the rows of the selection dial in alternately opposing directions to complete a succession of successful alignments of the image positions where each correct pairing of the designated images exponentially diminishes the probability of anyone arbitrarily guessing the precise combination of images required to gain admittance. In addition, the possibility of someone figuring out which specific images are being selected by observing how they are presented and then selected by the user is obscured by the lack of a fixed selection point and the collateral sets of decoy images that are also concurrently matched upon each alignment of the dial. When the matching of a pair of images has been completed, (as signaled by the user's rotation of the dial in the opposing direction), the client records the incremental offset in the alignment between the two opposing rows of image positions on the selection dial, and when the user has completed all of the required matches for the current authentication challenge, forwards an encrypted packet of this positional information to the authentication server for analysis and verification.

To carry out the verification process, the authentication server first rearranges the positions in its version of the positional matrix according to the unique shuffle formula assigned to the user during their registration process and then applies the shuffle formula generated for the current session. The server uses this positional information to simulate the population of a corresponding set of rows in the same manner in which the rows of images were presented to the user and then applies the offset as calculated from the relative alignment of the rows on the selection dial to determine which specific image positions have been matched by the user. The matching positions are then mapped to their corresponding positions in a comparator mechanism which, in the embodiment demonstrated for the purposes of this patent, consists of a three dimensional array where each cell represents all the possible image positions for all the sets of images that are assigned for presentation to a given user and where each cell is itself another three dimensional array representing all the image positions that could possibly be matched with a given cell in the main array. A database table with all the matched positions for the current authentication session are then compared with the matched positions that were derived during the registration process, and previously stored as part of the user's authentication profile, to determine if there are adequate matches to satisfy a predetermined sufficiency policy and, after requesting further matches if necessary, the server grants or denies access to the requesting user accordingly.

By relying on the recognition of a few easily identifiable images rather than on the recollection of some complicated password or PIN number, this image based authentication system provides a more convenient and less problematic way for user's to proffer something they know that indubitably authenticates their authority to access a secured environment or asset, and does so in a way that protects the user's secret information from being ascertained by key logging programs, man in the middle intrusions, phishing schemes, or over-the-shoulder observations (including sifting). Through the correspondence between a set of images and their associated positions in a configurable matrix, this system can administer an effective one-time authentication challenge without processing or storing any information that might otherwise be compromised by anyone intent on examining the source code, monitoring the processing of the application, sniffing the packets of data as they are transmitted over the network or hacking the database where the user's authentication profile details are stored. Finally, since the images used to administer the authentication challenge can be safely stored locally in a relatively small amount of memory and can be quickly presented to the user and selected without requiring any keystrokes from a keyboard or use of a pointing device, this authentication system can serve as a viable alternative to password and PIN based systems on a wide variety of devices for the following types of access control purposes:

Protecting personal and sensitive information on computers, tablets, phones, and other devices.

Restricting access to authorized users of on-line web sites and other network resources.

Establishing the authenticity of a user's identity when using a credit card to carry out personal and commercial on-line transactions over the network.

Providing two factor authorization in conjunction with a card or some other form of identification when using ATM's, point of sale terminals and kiosks or as an alternative to entering a zip code when purchasing gasoline.

Protecting access to secured physical facilities such offices buildings, work areas, storage lockers, etc.

Replacing physical key/lock systems for access to homes and businesses and even vehicle entry and ignitions systems.

As with any security related system, it can be expected that vigorous and innovative attacks will be mounted to try and reverse engineer the positional machinations that are employed by this system to obfuscate the addressing, presentation, selection and tracking of images. Fortunately, the reliance of this system on the correlation of positional data to perform its authentication functions provides a number of areas where the security of this system can be strengthened in proportional measure, particularly through the use of more sophisticated formulas that improve how the images are shuffled and referenced for extraction and presentation, by implementing more advanced types of selection mechanisms that increase the number of images and complexity of how they are presented for selection, and even by escalating the role of participation required by the user in the way they orient the selection mechanism or how the images are matched.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
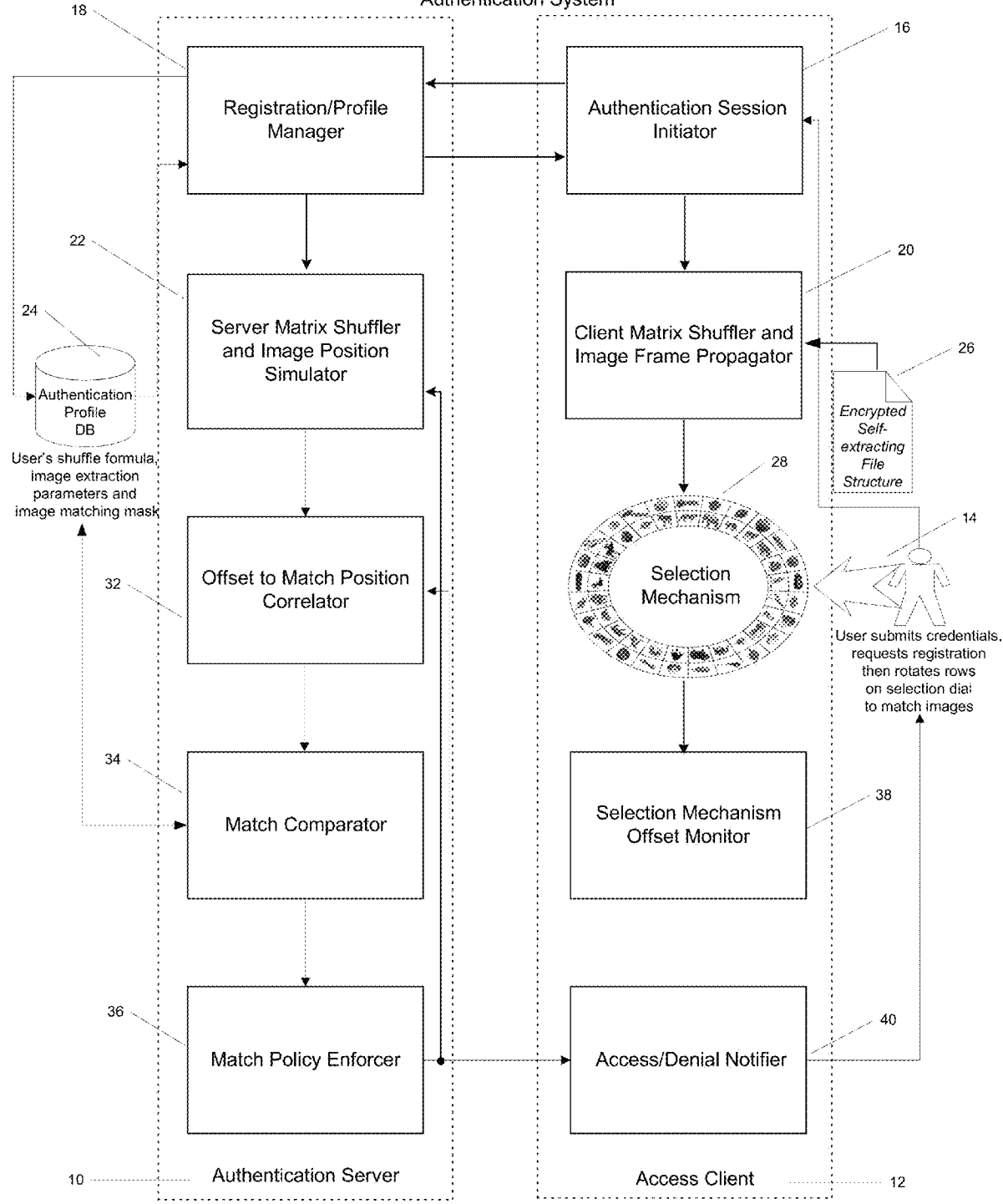
FIG. 1 is a detail view of a diagram that describes the functional components of the system and illustrates how they interact in the process of enrolling a user, administering the authentication challenge and then verifying the user's authority to access a protected environment or asset.

An authentication system is presented that verifies a user's authority to access a digital device, enter an on-line environment, carry out a commercial transaction or gain admittance to a physically protected asset based on their selection and subsequent ability to correctly match two or more types of images (e.g., vegetables, animals, minerals, etc.) that are presented in a mutually parallel arrangement through a selection mechanism 28. The order in which the images are presented to the user is based on the arrangement of their corresponding positions as correlated through a configurable matrix which subsequently allows the system to track the images selected by the user based on their associated positions. By utilizing the representational positions associated with the images and their relative alignment, this system can effectively address, record, track and verify the selection of images without having to reference, process, or store any explicit image identifiers, screen positions or file designators that could, if compromised, reveal the images that have been chosen by the user for the purpose of their authentication.

The positions associated with the images used in the course of administering the authentication challenge are defined through a positional matrix that dictates the order in which the images are extracted from the file structure where they are stored and assigned for presentation to the user through the selection interface. The positions assigned to a set of images are designed to be reconfigured through the use of a shuffle formula that specifies the direction and number of cells the images are advanced and repositioned within the matrix for presentation to a particular user for selection during a given authentication session. To prevent the assignment of positions for any user from being useful in determining the positions assigned to the images for any other user or by another implementation of the system, a unique shuffle formula is assigned to each user during the registration process that establishes the initial image positions in the matrix that are applied for that user during every authentication session. In addition, a new shuffle formula is used to rearrange the image positions in the matrix each time the user requests access thus providing an effective one-time challenge mechanism that precludes the observation of image positions selected in one session from being valid as a means of authentication in any subsequent sessions.

When a user requests access to a given environment or asset, the server generates a shuffle formula for the current session and sends it to the client which then rearranges the cells in its version of the matrix to determine the order in which a correlated set of images are to be extracted from the file structure where they are stored and assigned for presentation to the user through the selection interface. In a similar manner, the server applies the shuffle formula for the current session to its version of the matrix and is thus able to determine the order in which positions associated with the images are being presented to the user. Using these correlated positions, the server can then calculate the image positions that are being matched or aligned by the user over several iterations, save a positional representation of the images in its database and then compare these positions with those matched by the user to verify their right of access or establish their identification in subsequent sessions.

The images used for the authentication challenge are stored as contiguous frames in an encrypted and self-extracting file structure that is maintained locally by each client subsystem and are referenced and extracted according to the sequence with which they are arranged in the structure rather than through any specific image identifier that could reveal the images being selected by the user for the purpose of their authentication. The order in which the images are extracted from the file structure is specified by a set of algorithms that are instigated during the extraction 84 process according to parameters that are supplied by the server and then applied by the client to assign the extracted images to their corresponding positions as defined in the current matrix for presentation to the user through the selection mechanism 28.

A selection mechanism 28 serves as the user interface 14 for administering the authentication challenge, which for the purpose of this particular embodiment, makes use of a selection dial as the means for presenting the images and then tracking their selection by the user. The selection dial consists of counter rotating rows of images that the user must properly align by matching an image from one of the rows with another in some prescribed manner to verify their right of access or to establish their identification. A succession of successful alignments of the correct image positions are required to complete the authentication challenge, where each correct pairing of the designated images exponentially diminishes the probability of anyone arbitrarily guessing the series of correct images required to gain admittance. In addition, the ability to try and figure out which specific images are actually being selected, by observing their relative positions, is precluded by the collateral sets of decoy images that are concurrently aligned along with the images being intentionally matched by the user.

The client monitors the alignment of the images as they are manipulated by the user through the selection mechanism 28 and records the relative offset between the sets of images that are ultimately aligned. This positional information is then sent to the server which applies the offset to the sets of image positions that have been simulated through its version of the positional matrix to calculate which specific image positions are being matched by the user. The matched image positions for the current session are then compared with the matches selected by the user during their enrollment to determine whether they satisfy a calculated sufficiency policy and the user is either granted or denied access accordingly.

In reference to FIG. 1 which shows a generalized depiction of the functional components that make up the Authentication Server 10 and Access Client 12 portions of the authentication system.

The User Interface 14 depicts a user's interaction with the authentication system through the interface that requests the user's credentials, presents the authentication challenge and then signifies whether or not the user has been granted access to the requested environment or asset. The interface includes the necessary prompts and messages to guide the user through the authentication session and relies primarily on the image Selection Mechanism 28 which is employed by the user to initially select a series of images and to subsequently thereafter identify these images for the purpose of validating their right of access or verifying their identification. The interaction with the user can be facilitated through a web based interface or implemented by an application running on a personal computer, mobile phone or some other stand-alone device such as an ATM machine or point-of-sale terminal. A more self contained interface can alternately be incorporated by other devices such as keyless locks where the server and client portions of the system interact locally without being connected to a network or where the server portion is embedded within an identity card, token, or security badge that provides the user's credentials and other information required to administer and verify the authentication challenge for a given user.

The Authentication Session Initiator 16 initiates an authentication session when a user requests access by submitting the user's credentials to the server and then initiating an authentication challenge based on the formulated instructions that are returned from the server in response to the request. The user credentials can be a simple login name or a more sophisticated multiple factor authentication submitted by swiping a card through a card reader or presenting a security badge at a secured checkpoint. The instructions returned from the server are used to specify how the positions in the positional matrix maintained by the client are rearranged for the current session and to determine the order in which the images are extracted and assigned for presentation through the Selection Mechanism 28.

The Registration/Profile Manager 18 is responsible for determining whether or not the user making the request is registered and then either retrieving the profile information for users who have already registered or initiating the registration process for new users that have not yet established an authentication profile. If the user has not yet registered, they are assigned a personal shuffle formula that uniquely specifies how the image positions in the server's version of the positional matrix are to be initially arranged for that particular user during every subsequent authentication session. A set of image extraction parameters are also assigned to the user that specify which sets of images (vegetables, animals, sports equipment, etc.) the client is to access for the authentication challenge and the order in which the images are to be extracted and assigned to the appropriate positions in the matrix for presentation through the Selection Mechanism 28. As part of the registration process, the user is required to choose the images subsequently used to authenticate their right of access by matching an image in one of the presented sets with an image in another set through the Selection Mechanism 28. After the user has selected their images and thus completed the registration process, their unique shuffle formula, assigned image extraction parameters and a positional mapping associated with images they have chosen are all stored as components of the user's authentication profile to be consulted in subsequent authentication sessions.

When a registered user initiates an authentication session, the user's unique shuffle formula and the image extraction parameters are retrieved and the one-time shuffle formulas are generated for each pair of image sets that will be used during the current authentication session. This information is then transmitted to the Client Matrix Shuffler and Image Frame Propagator 20 which rearranges the frame positions within its version of the positional matrix, extracts the images from the file structure where they are stored and assigns them to the appropriate frame positions for presentation through the selection interface. In a similar manner, the user's personal shuffle formula, derived from their authentication profile and the one-time shuffle formula generated for the current session, are passed to the Server Matrix Shuffler and Image Position Simulator 22 which shuffles the image positions in its mirrored version of the positional matrix to simulate the order in which the images are being presented to the user and to subsequently calculate which image positions are being selected based on their alignment.

The Authentication Profile Database 24 stores the authentication profile information established for each user during their registration enrollment. The user's authentication profile includes the permanent shuffle formula specifying the initial arrangement of image positions in the positional matrix, the image extraction initiators that affect how the images are extracted by the client for presentation and a mapping of the matched image positions selected by the user during their enrollment and used for the purpose of authenticating their right of access in subsequent sessions.

The Client Matrix Shuffler and Image Frame Propagator 20 rearranges the image frame positions in the client's version of the positional matrix based on the shuffle formula generated for the current session. This module is also responsible for extracting the images from the file structure according to the extraction parameters, assigning the images to the appropriate positions and then populating the Selection Mechanism 28 with the designated images.

A Contiguous Frame File Structure 26 stores the various sets of images that are used to administer the authentication challenge in the form of image frames that can be extracted according to the sequential order in which they are arranged in the structure. One or more image extraction sequence routines are included as part of the self-extraction algorithm to specify where in the sequence of frames the extraction is to begin and in what order it is to proceed as modulated by parameters supplied by the sever. For instance, one of the routines could extract every other frame in a particular direction, beginning at some predetermined frame and, without having to know what the routine actually does, the server can select it and specify parameters that are input into the equation to consistently affect the results of the extraction each time a session is initiated for a given user.

The Selection Mechanism 28 depicts one embodiment of the type of interface that can be used to administer the image-based authentications challenge. It consists of counter rotating rows of images that the user advances in alternating directions to match the images selected during the registration process in order to authenticate their authority to access a given environment or asset. The center area of the dial can be used to display instructions and messages during the authentication session and can also be used for advertising purposes while the session is in progress. The number of images used for the authentication challenge can vary depending on the level of security that is required and, while the selection of three or four images would be more than adequate for most security considerations, because the images in this system are selected by matching one with the another, the number of selections required for a given session can be increased exponentially from the base pool of images by having the user match them in different combinations and by altering the order from one session to the next to further increase the security of the system.

The Selection Mechanism Offset Monitor 30 monitors the relative movement of the images as they are manipulated by the user and then records the offset in alignment between the sets of images and transmits this positional information to the server which uses it to determine which positions are being aligned in some prescribed manner by the user. For instance, when the user rotates the rows of images of the selection dial in opposing directions, the offset between the distance the rows have advanced in relation to one another at the point where the user makes their selection is recorded and it is this positional information, rather than any direct reference to the images themselves, that is transmitted to the Offset to Match Position Correlator 32 for verification.

The Server Matrix Shuffler and Image Position Simulator 22 rearranges the image positions in the server's version of the positional matrix, first according to the unique shuffle formula that was assigned to the user during the registration process and then using the shuffle formula generated for the current session. The image positions in the matrix maintained by the server mirror the frame positions that are defined in the matrix used by the client thus providing the correlation that allows the server to determine the order in which the image positions have been presented to the user through the selection dial and to subsequently determine which positions are being matched based on the offset.

The Offset to Match Position Correlator 32 uses the image positions from the positional matrix that has been simulated by the server for the current session and then applies the offset to the sets of images based on the positional information that is passed from the client. The offset between the sets of images is used to calculate which image positions have been aligned by the user in some prescribed manner and this information is then sent to the Match Comparator 34 to determine if the user has matched the correct images required to gain admittance.

The Match Comparator 34 utilizes a comparator mechanism to compare the image positions that have been matched for the current session with the mapping of matches that was established for the user during their registration process to determine if the correct images have been identified. In the embodiment presented, the comparator mechanism consists of a three dimensional array where each cell represents all the possible image positions for all the sets of images that are assigned for presentation to a given user and where each cell is itself another three dimensional array representing all the image positions that could possibly be matched with a given cell in the main array.

The Match Policy Enforcer 36 implements and enforces the policies that determine whether or not a sufficient number of images have been correctly aligned in some prescribed manner. A sufficiency algorithm is used to determine if an appropriate number of matches have occurred and if there are insufficient matches, further selections can be presented to allow the user further opportunities to complete the correct matches. After the analysis of the matched image positions has been completed, a notification is sent back to the Access/Denial Notifier 38 which is responsible for apprising the user as to whether they have been granted or denied access.

The Access/Denial Notifier 38 displays the appropriate messages through the User Interface 14 to inform the user whether their request for access has been granted or denied. If the authorization verification is successful, the server allows access to the restricted environment or protected asset otherwise the user is sent a notification indicating that their request for access has been denied. The client may then provide further instructions on possible alternatives available to the user or can enforce any security policies regarding a failed access, such as denying further attempts at access for a given period of time.

Figure 2:
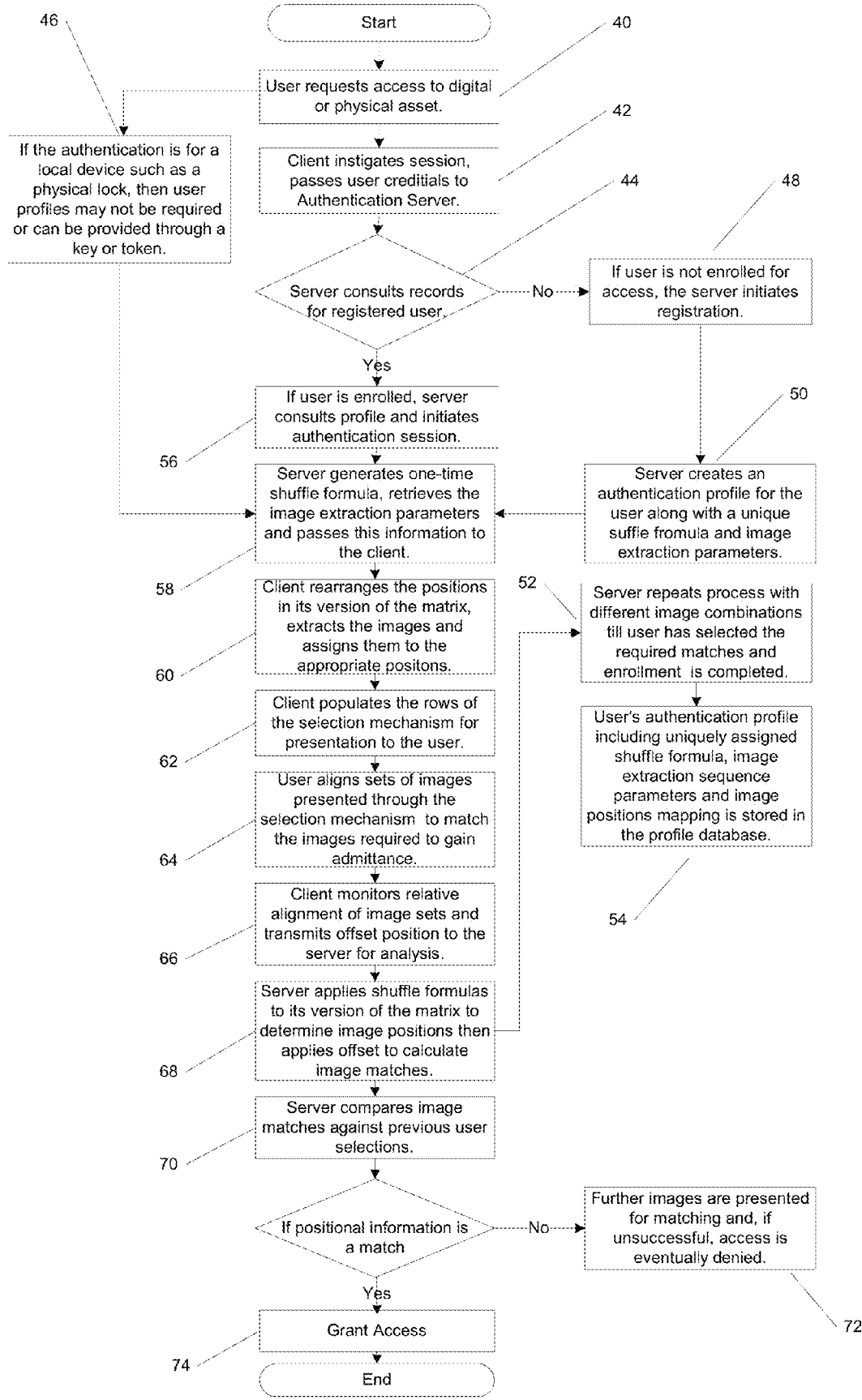
FIG. 2 is a detail view of a flowchart that depicts the various steps involved in processing a user's registration and subsequent request for access, extracting and presenting the images through the selection mechanism, recording the user's matching of images, and finally comparing the user's selections with those specified during the initial registration for the purpose of verifying their right of access for a given authentication session.

In reference to FIG. 2 which shows the process flow of the authentication system.

(Step 1) 40 An authentication session is initiated when a user requests access to a computing device, on-line environment or physical asset that is protected by the authentication system.

(Step 2) 42 The users request for access is handled by the Access Client 12 that asks for the user's credentials (usually in the form of a login name) and then forwards the request for access along with the user's credentials to the Authentication Server 10.

(Step 3) 44 When a request for access is received, the Authentication Server 10 consults the records in the Authentication Profile Database 24 for a registered user based on the credentials that have been submitted by the Access Client 12 on behalf of the user that is making the request.

(Step 4) 46 If the authentication session is initiated through a local device such as a personal computer, smart phone, or even a keyless lock, then user profiles are not required as the client and server portions of the system can be embedded in the device and operate locally. As another alternative, a user profile could be stored on a card or some other form of credentials such as an electronic key that would act in place of the server portion of the application to generate the shuffle formula and extraction sequence and then perform the verification functions thus providing a secure method of multiple factor authentication.

(Step 5) 48 If no corresponding record can be located for the user requesting access based on the credentials that have been submitted, the server instigates a registration enrollment for the user.

(Step 6) 50 During the registration process, the server creates an authentication profile for the user and assigns the unique shuffle formula to establish the initial arrangement of positions used by the server when creating its version of the positional matrix. A set of image extraction parameters are also assigned that specify which image sets are to be extracted and the order they are to be assigned to the positions in the client's version of the matrix for presentation through the Selection Mechanism 28. The Authentication Server 10 then generates a one-time shuffle formula and passes it along with the image to the Access Client 12 which creates its matrix, extracts the appropriate images and presents them to the user through the Selection Mechanism 28.

(Step 7) 52 Using the Selection Mechanism 28, the user is required to choose the images they want to use for the purpose of authenticating their right of access in subsequent sessions by matching one of the desired images from one of the image sets with another from one of the other sets. This process is repeated until the user has completed the requisite number of matches appropriate for the intended level of security and the system is satisfied that the user is adequately trained to select the correct over several iterations.

(Step 8) 54 Based on the information gathered during the registration, the user's authentication profile including the uniquely assigned shuffle formula, image extraction initiators and image position mappings are stored in the Authentication Profile Database 24 for the purpose of administering and verifying subsequent authentication challenges for that user.

(Step 9) 56 If the user is already enrolled, the server retrieves the user's profile along with the unique shuffle formula and image extraction parameters that were assigned to the user during their enrollment.

(Step 10) 58 The Authentication Server 10 then generates a one-time shuffle formula and passes this information along with the image extraction algorithms to the Access Client 12 for the purpose of shuffling the positions in its version of the matrix.

(Step 11) 60 Once received, the client applies the shuffle formula to rearrange the positions in its version of the positional matrix and then extracts the images from the file structure where they are stored and assigns them to the appropriate frame positions for subsequent presentation to the user.

(Step 12) 62 The client advances the image positions through the matrix in a predefined order based on the shuffle formula, assigns the images extracted from the file structure to their appropriate positions and then populates the rows of the Selection Mechanism 28 with the appropriate images.

(Step 13) 64 The user is then responsible for aligning the sets of images presented through the Selection Mechanism 28 to match one of their secret images with another. When the user begins rotating the rows in the opposite direction, a new row is added for the user selection until all the images for the session have been correctly identified.

(Step 14) 66 The client monitors the relative alignment of image sets and, when the user is finished matching their selections, records the offset between the matched positions and sends this positional information to the server where it will subsequently be parsed and analyzed.

(Step 15) 68 The server applies shuffle formulas to its version of the positional matrix to determine the image positions for the current session and then applies the offset to calculate which range of image positions are being aligned.

(Step 16) 70 The server uses the comparator mechanism to compare the matches for the current session with the images that were initially chosen by the user during their enrollment.

(Step 17) 72 If positional information does not match, then the challenge or some portion can be administered again and if it cannot eventually satisfy the sufficiency quotient, then the request is denied.

(Step 18) 74 If the positional information is matched based on the mapping associated with the user's authentication profile, then the request is granted.

At this point, the authentication session is concluded.

Figure 3:
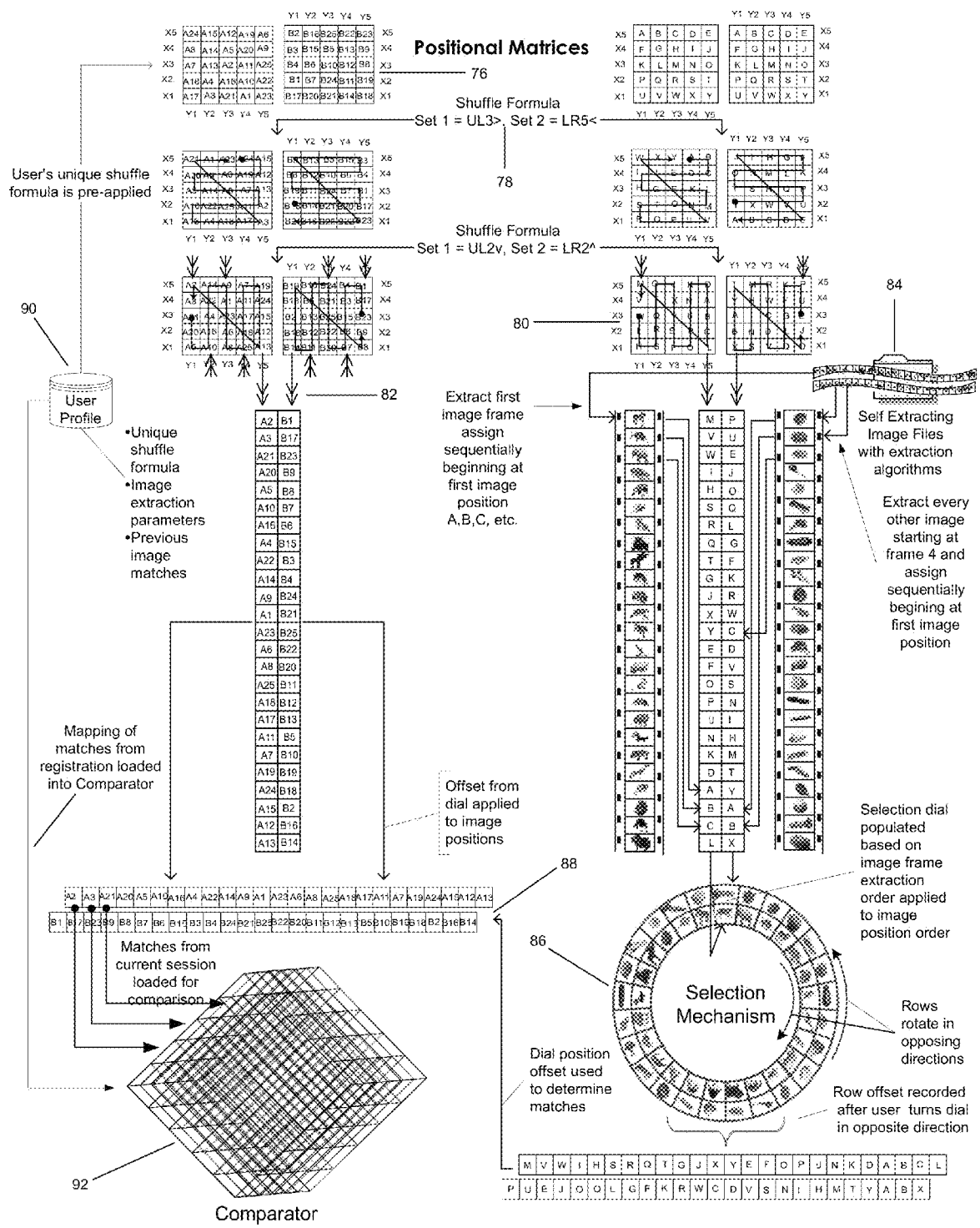
FIG. 3 is a detail view of a schematic that depicts the internal logic and calculations that are performed by the authentication system in the course of administering and verifying an image based authentication challenge.

In reference to FIG. 3 that shows a schematic depicting the internal logic and calculations that are performed in the course of administering and verifying the image based authentication challenge.

The upper portion of the schematic shows a rudimentary example of the progressive rearrangement of positions that are performed for two sets of images as they are processed through the positional matrices that are maintained in common by both the server and client portions of the application. The advancement of image positions within the matrices and the direction of movement for each successive rearrangement are dictated by shuffle formulas that are generated at the start of each authentication session and then applied in an identical manner by both the client and server to their respective versions of the positional matrices. The client uses its version of the matrix to determine the order for assigning a set of images for presentation through the Selection Mechanism 28 and the server uses its version of the matrix to simulate the order in which the images are being presented to the user so it can subsequently track which image positions have been selected for the purpose of verifying the user's right of access.

The first depiction 76 of the matrices show the initial positions before the one-time shuffle formulas have been applied. It should be noted that the initial starting positions in the matrix maintained by the server are pre-shuffled at the start of each session using the unique shuffle formula that was assigned to the user during their registration enrollment.

In the second depiction 78, a shuffle formula (UL3> or Upper Left, 3 to the (>) right) is assigned to specify that all the positions in the first set of matrices maintained by both the server and the client should be moved three cells to the right starting from the first cell in the upper left corner. In a similar manner, the shuffle formula (LR5< or Lower Right 5 to the (<) left) is assigned to specify that all the positions in the second set of matrices should be moved five cells to the left starting with the last cell in the lower left corner.

In the third depiction 80, the shuffle formula (UL2v or Upper Left, 2 (v) down) is applied to the first set of matrices specifying that the positions in the matrices should be moved two cells downward starting from the upper left corner. In a similar manner, the shuffle formula (LR2^ or Lower Right, 2 (^) up) specifies that the positions for the second set of images should be moved two cells upwards starting from the lower right corner.

After the matrices have been appropriately shuffled, the positions are advanced in tandem into the parallel rows 82 (as illustrated by the direction of the double headed arrows). The client uses the rows of positions to determine the order in which to assign the images for presentation through the Selection Mechanism 28 and the server uses the corresponding rows to determine the order in which the image positions are being presented through the selection interface so it can subsequently determine which image positions are being selected by the user.

The various sets of images used to administer the authentication challenge are stored in encrypted and self extracting file structures whose selection and order of assignment is determined by algorithms that are applied during the extraction 84. The server assigns a set of images to each user during the registration process specifying which sets of images are to be extracted for presentation as well as other values that are input into the algorithm to consistently affect the order of extraction for a particular user during every authentication session.

As shown in the example, the image extraction algorithm might specify that the images should be extracted sequentially beginning with the first frame in the series which would then be assigned to the first image (A) in its current position, the second frame would be assigned to the second image (B) in its current position, and so on. As another example, the extraction algorithm could specify that every other frame in the series should be extracted beginning with the fourth frame so that the forth frame in the series would be assigned to the first image (A) with the sixth frame being assigned to the second image (B) and so forth.

Once the extracted images are assigned to the appropriate positions established through the shuffled positions in the current matrix, each row in the Selection Mechanism 28 is populated with the appropriate images. The Selection Mechanism 28 consists of two or more rows of images that the user rotates in opposing directions or manipulates in some other manner with the intent of matching or establishing a correlation between one of the selected images in one row with an image in the another row 86.

The rotation and placement of the dial positions are monitored during the course of operation and the placement of the dial are recorded. This positional information is eventually transmitted to the server.

The server applies the offset to the rows of image positions 88 that have been simulated for the current session to determine the positions associated with the images that the user has selected.

The positional information associated with the images selected by the user during the current session is sent to the comparator mechanism. The positional mappings stored in the user's profile database 90 for the images that were selected by the user during the registration process are also loaded into the comparator mechanism.

The Comparator then compares the matches 92 for the images matched by the user during the current session with the matches derived from the user's registration to determine if there is a correspondence. The matches are analyzed according to a policy setting that specifies how many matches are required and, if the matches conform to the currently established policy, the user is successfully authenticated. If the user is not able to be authenticated on the first try, additional attempts may be allowed until the user is eventually denied access.

Figure 4:
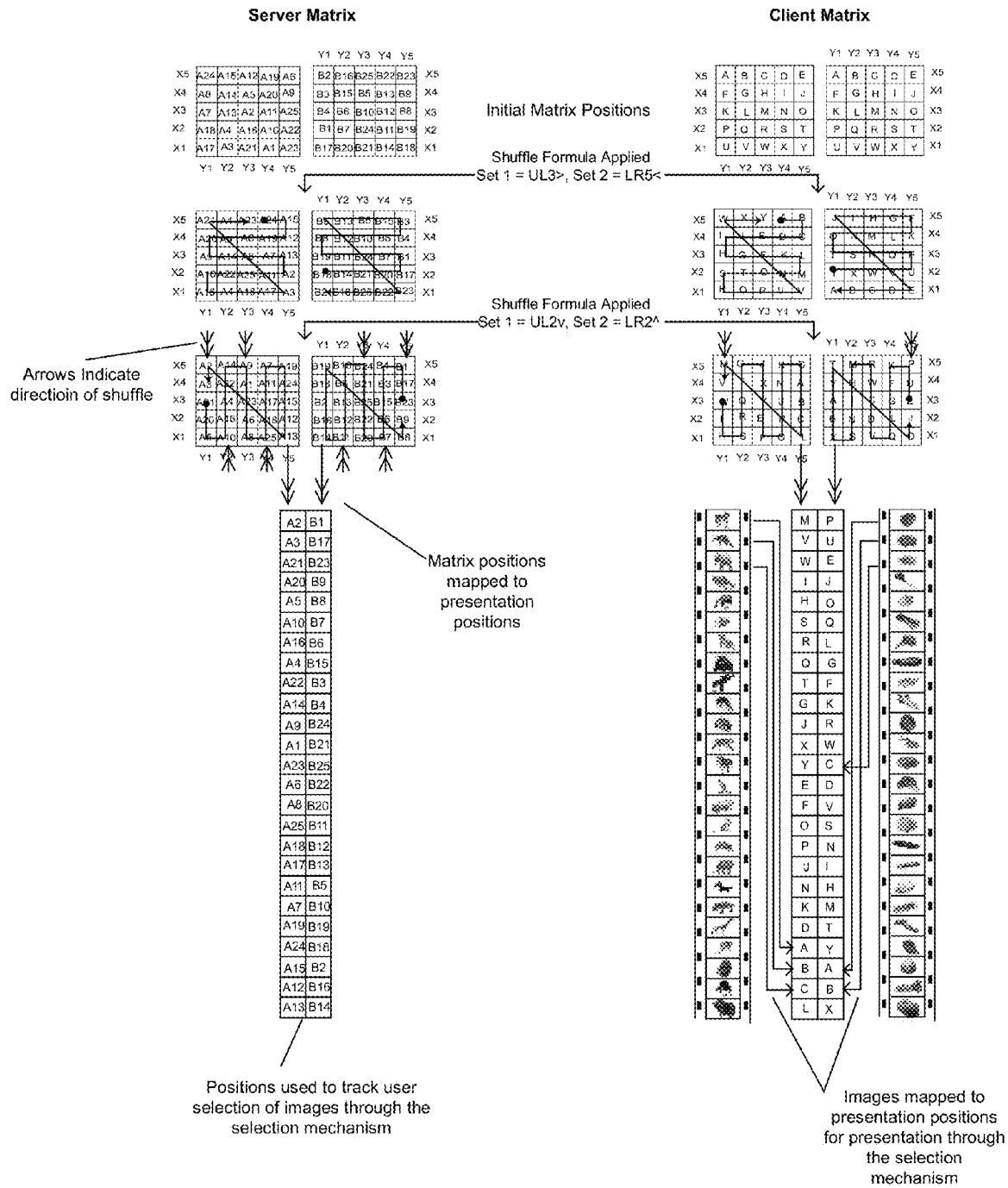
FIG. 4 is a front detail view of a depiction of shuffle formula applied to the positional matrices used by the client to specify the order in which two corresponding sets of images are extracted and presented to a user through a selection mechanism and used by the server to subsequently determine the positions associated with the images selected by the user.

In reference to FIG. 4, the shuffle formulas are shown being applied to the positional matrices maintained by the by the client to specify the order in which two corresponding sets of images are extracted and presented to a user through a selection mechanism 28 and used by the server to subsequently determine the positions associated with the images selected by the user.

Figure 5:
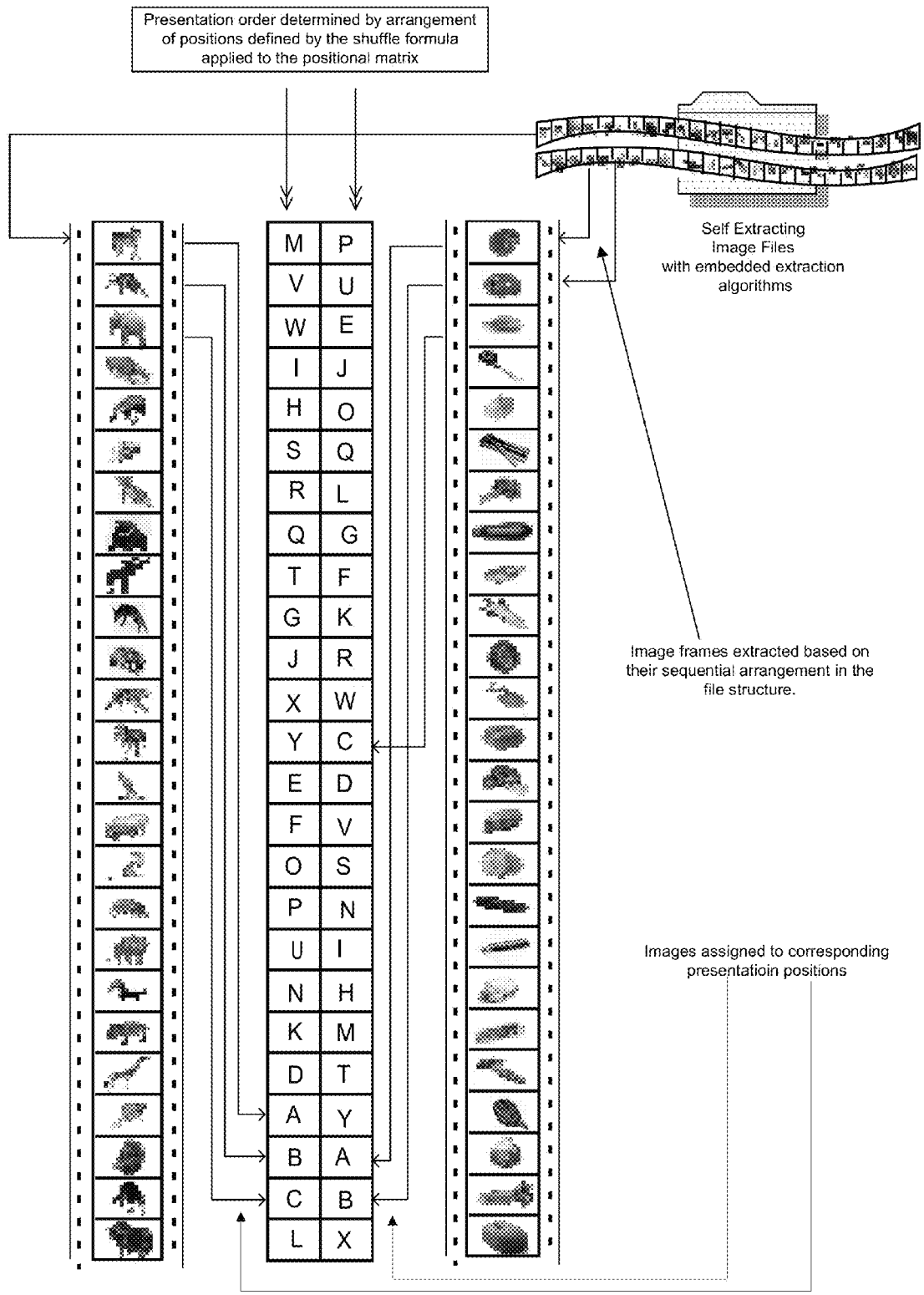
FIG. 5 is a front detail view of a depiction of images being extracted from a file structure according to a selected extraction algorithm and then assigned to their corresponding positions, as defined in a correlated positional matrix, for presentation to a user through a selection mechanism.

In reference to FIG. 5, the image extraction sequence is depicted showing how the images are addressed and extracted from a file structure according to a given extraction algorithm and then assigned to their corresponding positions, as defined by a correlated positional matrix, for presentation to a user through a selection mechanism 28.

Figure 6:
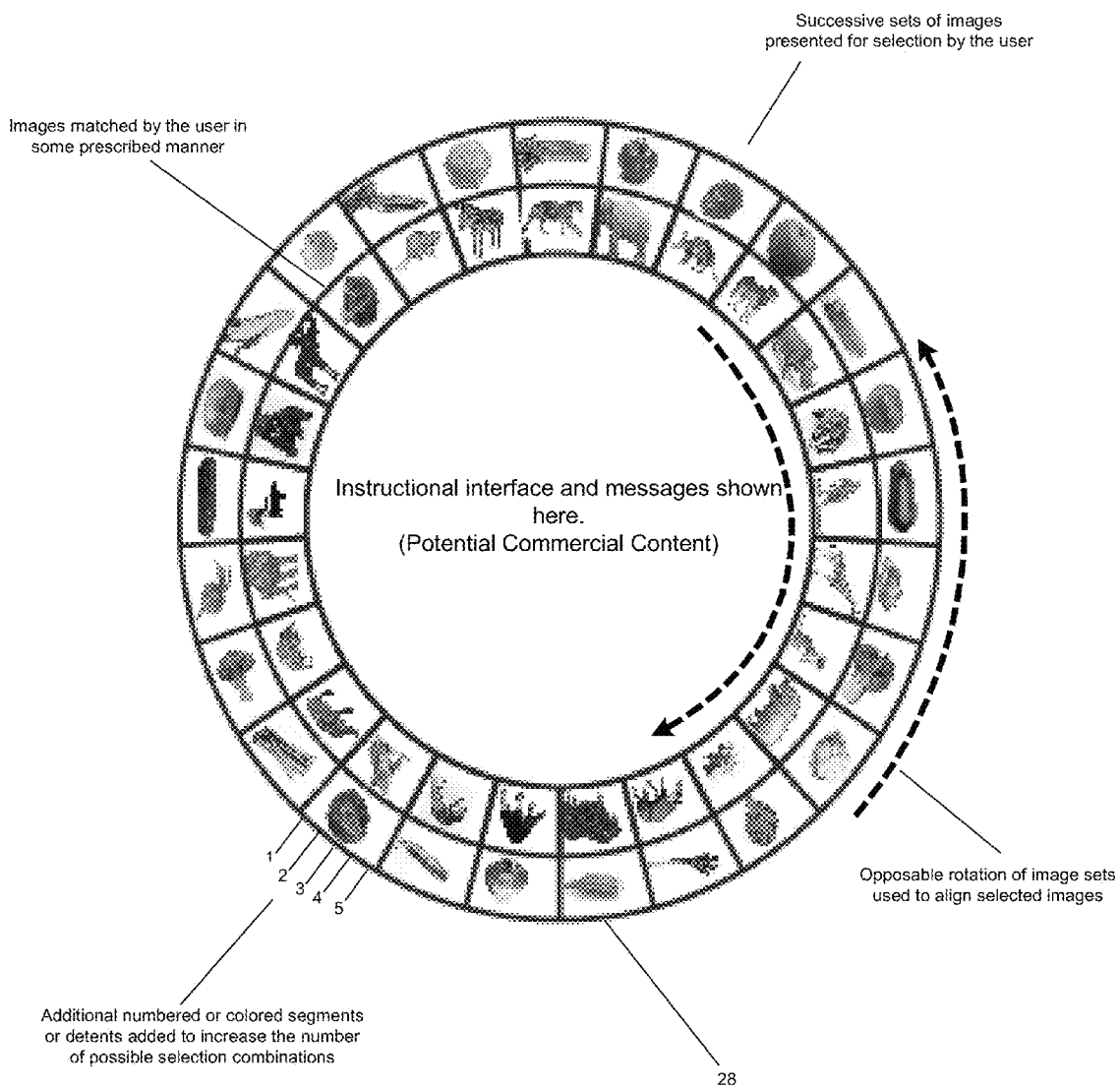
FIG. 6 is a front detail view of a depiction of a selection mechanism that, once populated by two sets of images from different categories, allows the user to verify their right of access or establish their identification by aligning a selected image from one row of the dial with another in some prescribed manner.

In reference to FIG. 6, an example is shown of a selection mechanism 28 that, once populated by two sets of images from different categories, allows the user verify their right of access or to establish their identification by aligning a selected image from one row of the dial with another in some prescribed manner.

Figure 7:
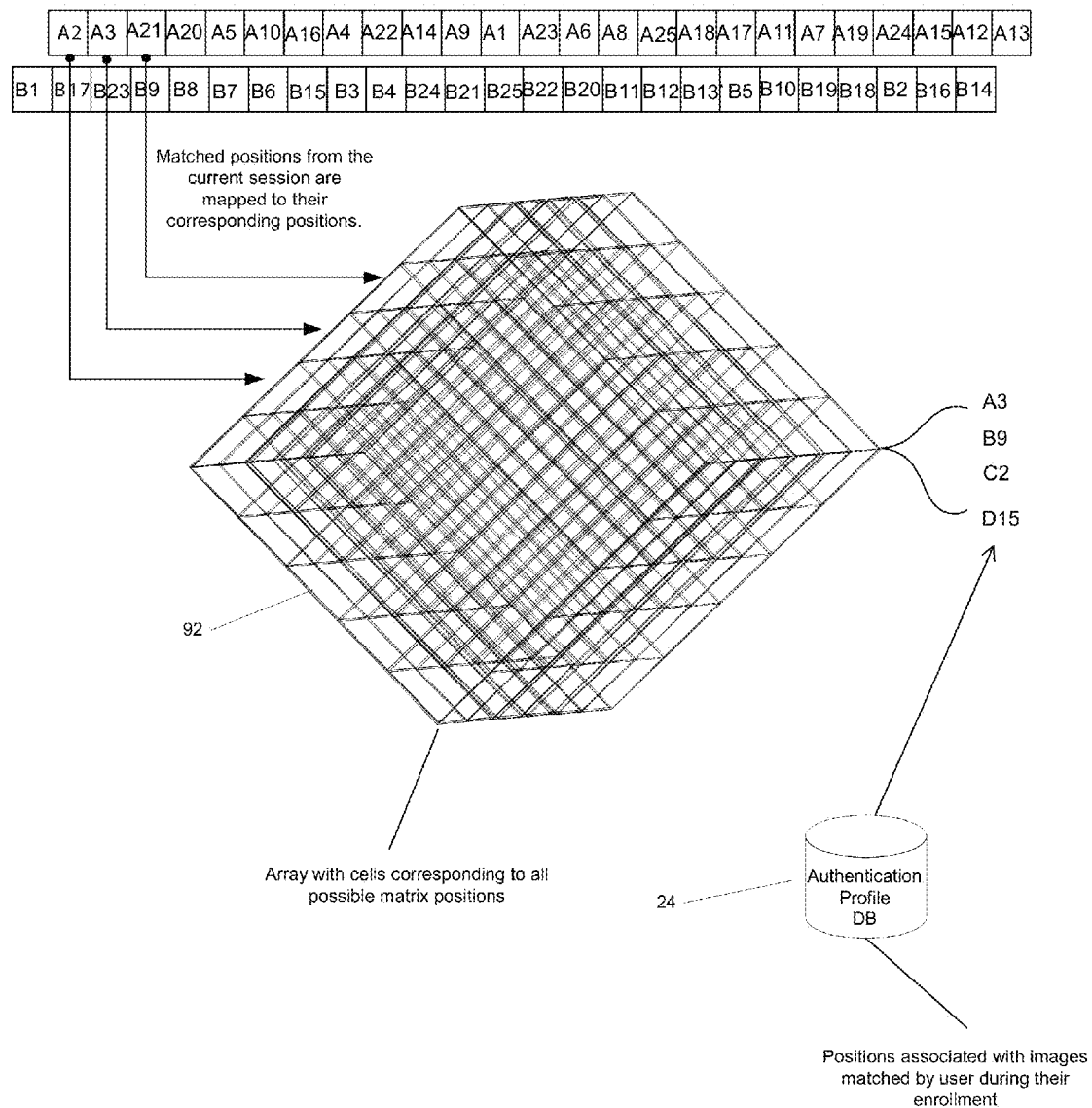
FIG. 7 is a front detail view of a depiction of the process whereby the images selected by a user through a selection mechanism are mapped to their corresponding positions in an array where they can subsequently be compared to the positions associated with the images selected by the user during their registration for the purpose of verifying their authentication.

In reference to FIG. 7, an example illustrates the process whereby the images selected by a user through a selection mechanism 28 are mapped to their corresponding positions in an array where they can subsequently be compared to the positions associated with the images selected by the user during their registration for the purpose of verifying the users authentication.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An authentication system that validates a user's authority to access a computing device, enter an on-line environment, carry out a commercial transaction or gain admittance to a physically protected asset through the administration of an authentication challenge that relies on an arrangement of positions defined in a matrix to specify the order in which a corresponding set of images are assigned for presentation to the user through a selection mechanism and to then determine which images are being selected based on the relative alignment of their representational positions after being repositioned by the user in some prescribed manner thus allowing the system to perform its authentication functions without having to explicitly reference, process, transmit or store any specific image identifiers, display coordinates or file designators that could, if compromised, expose the proprietary images chosen by the user for the purpose of their authentication, as comprised of the following:

a. means for utilizing an arrangement of positions defined through a configurable matrix to specify the order in which a set of images, extracted from a file structure where they are stored, are assigned for presentation to a user through a selection mechanism during the administration of an authentication challenge and to subsequently track, transmit, process, store and validate the images selected by the user for the purpose of their authentication based on the representational positions associated with the images thus avoiding the need of having to explicitly reference any specific image identifiers or display coordinates that could otherwise expose the user's selection of images;

b. means for storing a set of digitally rendered images as consecutive frames in a file structure and subsequently addressing the images for extraction and presentation to a user through a selection mechanism during the administration of an authentication challenge based on the consecutive order in which the image frames are stored and the sequence with which the images are addressed for extraction and assigned to their corresponding positions as defined through a correlated matrix thus allowing the system to address and present the images based on the arrangement of their corresponding frame positions in the file structure rather than through the explicit referencing of any specific image identifiers or file designators that could otherwise expose the images being presented to or selected by the user for the purpose of their authentication;

c. means for addressing and displaying two or more sets of digitally rendered images in a mutually parallel arrangement through a selection mechanism based on the sequence with which the images are extracted from the file structure where they are stored and the order in which the images are assigned to their corresponding positions as defined by their arrangement in a correlated matrix thus allowing the system to present the images during the administration of an authentication challenge without having to maintain or process any explicit references to any specific image identifiers, associated display coordinates or file designators that could otherwise expose the images selected by the user for the purpose of their authentication;

d. means for eliciting a user's selection of images during the administration of an authentication challenge, by requiring the user to realign, in some prescribed manner, two or more sets of images that have been presented in a mutually parallel arrangement through a selection mechanism, for the purpose of identifying the images required to validate the user's right of access or verify their identity without having to overtly select the images through a visibly observable or programmatically traceable selection point or display coordinate and which relies on the concurrent alignment of the surrounding collateral images to serve as decoys that obfuscate the user's selections of images from observation or interception by an interloper or monitoring program;

e. means for acquiring a positional representation of the images selected by a user for the purpose of validating their right of access or verifying their identity during an authentication challenge by monitoring the initial positions of two or more sets of images that have been presented in a mutually parallel arrangement through a selection mechanism and then utilizing the offset in alignment between one of the sets of images and another, after being repositioned by the user in some prescribed manner, as the metric for processing and conveying the user's selection of images rather than relying on the explicit referencing or transmission of any specific image identifiers or associated display coordinates that could otherwise reveal the images chosen by the user for the purpose of their authentication;

f. means for determining the range of positions associated with the images selected by a user for the purpose of validating their right of access or establishing their identity during an authentication challenge by utilizing the arrangement of positions in a matrix to replicate the order in which a corresponding set of images have been presented to the user through a selection mechanism and then applying an offset between the positions associated with one set of images and another, as reflected by the user's realignment of the images in some prescribed manner, to track the images chosen by the user thus obviating the need of having to explicitly reference any specific image identifiers or associated display coordinates that could otherwise reveal the images chosen by the user for the purpose of their authentication;

g. means for determining the precise positions associated with the images chosen by a user for the purpose of their authentication during an enrollment process and subsequent authentication challenge by utilizing a comparator mechanism to analyze the range of positions associated with the images aligned by the user in some prescribed manner through a selection mechanism and then eliminating all but those positions that are consistently aligned over a sufficient number of successive iterations to be deemed adequate for authenticating the user thus obviating the need of having to explicitly reference any specific image identifiers or associated display coordinates that could otherwise reveal the images chosen by the user for the purpose of their authentication;

h. means for storing and retrieving positional representations of the images chosen by a user for the purpose of their authentication during an enrollment for an authentication challenge by utilizing the positions associated with the images as defined by their arrangement in a correlated matrix, that have been consistently aligned by the user in some prescribed manner through a selection mechanism over a sufficient number of successive iterations, thus allowing the system to authenticate the user based on the positions associated with the images they have chosen rather than through the explicit referencing of any specific image identifiers or associated display coordinates that could otherwise reveal the images chosen by the user for the purpose of their authentication;

i. means for determining whether a user has successfully identified the images required to validate their right of access or establish their identity during an authentication challenge by utilizing a comparator mechanism to compare the positions associated with the images chosen by the user during their enrollment, as defined by their arrangement in a correlated matrix, with the positions associated with the images aligned by the user in some prescribed manner through a selection mechanism during a subsequent authentication challenge thus allowing the system to authenticate the user based on the representational positions associated with images they have chosen rather than through the explicit referencing of any specific image identifiers or associated display coordinates.

2. The authentication system in accordance with claim 1, wherein said configurable matrix is comprised of an arrangement of cells that are delineated by their respective column and row coordinates and where each cell in the matrix represents an assigned and corresponding image position.

3. The authentication system in accordance with claim 2, wherein said positions are designed to be rearranged through a shuffle formula that specifies the number of cells and direction in which the positions are advanced within a positional matrix for the purpose of assigning the initial arrangement of positions to a particular user during their enrollment and to subsequently establish the order in which a corresponding set of images are presented to the user from one authentication session to another.

4. The authentication system in accordance with claim 1, wherein said file structure used to store and retrieve the images for the purpose of administering an authentication challenge is encrypted and includes a self extraction mechanism that automatically extracts the images according to a collection of predefined extraction algorithms.

5. The authentication system in accordance with claim 4, wherein said extraction algorithms specify the starting positions and sequence with which a given set of images are extracted from the file structure where they are stored and assigned to their associated positions as defined through a correlated matrix.

6. The authentication system in accordance with claim 5, wherein said extraction algorithms are instigated during the administration of an authentication challenge by an extraction initiator that is assigned to each user during their enrollment and used thereafter to consistently specify the order in which a given set of images are extracted and assigned to their associated positions, as defined through a correlated matrix, for presentation to the user through a selection mechanism during a subsequent authentication challenge.

7. The authentication system in accordance with claim 1, wherein said mutually parallel arrangements of images are presented from a variety of different categories that requires the user to correctly match one of the images selected during their enrollment with another in some prescribed manner in order to validate their right of access or verify their identification.

8. The authentication system in accordance with claim 7, wherein said prescribed alignment of images can be an exact one to one matching of the images, can be a replacement of one image position with another or can be a matching of images using an offset that the user selects during their enrollment.

9. The authentication system in accordance with claim 7, wherein said prescribed alignment of images can be further enhanced to bolster the security of the system by including additional segments or cues for each image position that require the user to match some additional identifying attribute such as a number or color along with the images selected for the purpose of their authentication.

10. The authentication system in accordance with claim 1, wherein said comparator mechanism is comprised of an array that represents all of the possible positions for each set of images presented to a user during an initial enrolment process as well as during subsequent authentication sessions and which can be used to compare these positions during the processing of an authentication challenge.

11. The authentication system in accordance with claim 10, wherein said comparator mechanism is used during an initial enrolment to compare the positions associated with the images selected by the user with those in an array of all possible positions until all but the image positions that are consistently selected by the user over several presentation/selection cycles remain and are thus deemed the positions associated with the images the user has selected for the purpose of their authentication.

12. The authentication system in accordance with claim 10, wherein said comparator mechanism is used to compare the positions associated with the images selected by the user during their enrollment with the positions associated with the images selected in subsequent authentication challenges to determine whether a statistically sufficient number of correct image selections have occurred to adequately authenticate the requesting user.

13. A method for establishing a correlation between an arrangement of positions in a positional matrix and the order in which a set of corresponding images are presented to a user through a selection mechanism during an authentication challenge thus allowing the system to track, process, transmit and store the user's selection of images based on the order of arrangement and relative alignment of their representational positions rather than through the explicit referencing of any specific image identifiers, display coordinates or file designators that if compromised, could reveal the proprietary images chosen by the user for the purpose of their authentication, as comprised of:

a. specifying the order in which a set of images are assigned for presentation to a user through a selection mechanism during an authentication challenge based on the arrangement of their corresponding row and column positions as defined through a correlated positional matrix;
 b. tracking the images selected by a user for the purpose of validating their right of access or verifying their identity during an authentication challenge based on the order of arrangement and relative alignment of their corresponding positions as defined through a correlated positional matrix;
 c. processing and transmitting a positional representation of the images selected by a user for the purpose of validating their right of access or verifying their identity during an authentication challenge based on the positions associated with the images as defined through a correlated positional matrix;
 d. storing and retrieving a positional representation of the images selected by a user for the purpose of validating their right of access or verifying their identity during an authentication challenge based on the positions associated with the images as defined through a correlated positional matrix;
 e. verifying whether a user has correctly identified the images required to validate their right of access or verify their identity during an authentication challenge by comparing the positions associated with the images chosen by the user during an enrollment, as defined through a correlated matrix, with the positions associated with the images selected by the user for the purpose of their authentication in a subsequent authentication session.

14. A method for shuffling the assignment of base positions in a matrix for the purpose of altering the order in which a corresponding set of images are assigned for presentation to a user during the administration of an authentication challenge thereby preventing the knowledge or discovery of the positions associated with the images chosen by a particular user for the purpose of their authentication, or the order in which the images are presented to or selected by the user during a given authentication challenge, from being useful in determining the positions associated with the images assigned to any other user or from being valid as a means of authentication in any subsequent authentication session:

a. utilizing a formula to specify the direction and number of cells that the base row and column positions in a positional matrix are advanced and rearranged for assignment to a particular user during their enrollment for an authentication challenge thus ensuring that the positions associated with a given set of images selected by the user for the purpose of their authentication are unique and cannot be used to determine the positions associated with the images selected by any other user or by any other implementation of the authentication system;
b. utilizing a formula to specify the direction and number of cells that the base assignment of row and column positions in a positional matrix are shuffled for the purpose of altering the order in which a corresponding set of images are presented to the user through a selection mechanism from one authentication challenge to another thereby preventing the observation, monitoring or interception of the order in which the images are presented to or selected by a user during any given authentication challenge from being used to gain access or to impersonate the identity of a user during any subsequent authentication challenge.

15. A method for storing a set of digitally rendered images as consecutive frames in a file structure where the images can subsequently be addressed for extraction and presentation to a user through a selection mechanism during the administration of an authentication challenge based on the order in which the image frames are stored in the file structure and the sequence with which the images are addressed for extraction and assigned to their corresponding positions as defined in a correlated positional matrix thereby avoiding the explicit referencing or processing of any specific image identifiers or file designators that could otherwise reveal the association between the images that are presented to or selected by the user and the representational positions used by the authentication system to perform its authentication functions; as comprised of:
   a. storing a set of digitally rendered images as consecutive frames in a file structure where the images can subsequently be addressed for presentation to a user through a selection mechanism during the administration of an authentication challenge according to the sequential order in which the images are arranged in the file structure where they are stored rather than through the explicit referencing of any specific image identifiers or file designators;
   b. addressing and extracting a set of digitally rendered images for presentation to a user through a selection mechanism during the administration of an authentication challenge based on the consecutive order in which the images are arranged in the file structure where they are stored and the sequence with which they are extracted rather than through the explicit referencing of any specific image identifiers or file designators;
   c. specifying the sequence with which a set of digitally rendered images are extracted from a file structure where they are stored and assigned to a given position for presentation to a user through a selection mechanism during an authentication challenge by utilizing an extraction algorithm that specifies where in the series of consecutive image frames the extraction is to begin and in what sequence the images are to be extracted rather than through the explicit referencing of any specific image identifier;
   d. establishing the order in which an extracted set of images are presented to a user through a selection mechanism during an authentication challenge based on the sequence with which the images are extracted from the file structure where they are stored and the order in which they are assigned to an arrangement of corresponding positions as defined in a correlated matrix thus allowing the authentication system to present and track a user's selection of images based on the order of their representational positions rather than through the explicit referencing of any specific image identifiers or display coordinates;
   e. restricting access to the file structure in which the images used for the purpose of administering an authentication challenge are stored by encrypting the information and then relying on a built-in extraction utility to decrypt and extract the images according to an extraction algorithm that is instigated by a properly structured and verified extraction initiator from an authorized authentication system;
   f. restricting access to the algorithms used to specify the order in which a set of images are extracted from a file structure for the purpose of administering an authentication challenge by embedding the extraction algorithms within the same encrypted file structure where the images are stored so that the algorithms can be selectively addressed and executed by an extraction utility during an authentication session that has been initiated by an authorized authentication system;
   g. selecting and controlling the execution of one or more algorithms that specify the order in which a given set of images are extracted from a file structure during an authentication challenge through the use of an extraction initiator that allows the authentication system to consistently specify how the extraction takes place for a particular user from one authentication session to the next depending on the extraction initiator that is selected thus allowing the authentication system to perform its authentication functions without having to know which specific sets of images are being addressed or in what order the images are being extracted and assigned to their associated positions for presentation to the user.

16. A method for administering an authentication challenge by presenting two or more sets of images from several categories (animals, vegetables, sports equipment, etc.) in a mutually parallel and adjacently opposable arrangement through a selection mechanism (for example, a selection dial) that requires a user to correctly match or align the images from one of the categories with those of another in some prescribed manner as their means of identifying the images needed to validate their right or access or verify their identification and which relies on the concurrent alignment of the surrounding collateral images to serve as decoys that obfuscate the user's specific selection of images from observation or interception by an interloper or monitoring program, as comprised of:
   a. establishing the order in which two or more sets of digitally rendered images are presented to a user through a selection mechanism during an authentication challenge based on the sequence with which the images are extracted from the file structure where they are stored and the order in which the positions associated with the images are arranged in a correlated matrix thus allowing the authentication system to present and track the selection of images based on the order of their representational positions rather than through the explicit referencing of any specific image identifiers or display coordinates;
   b. populating a selection mechanism with two or more categories of images for selection by a user during an authentication challenge by arranging the sets of images in mutually adjacent rows or columns that can be moved in parallel with relation to one another in alternately opposing directions thus allowing a user to identify the images required to validate their right of access or verify their identification by realigning the images from one category with those from another in some prescribed manner;

c. eliciting a user's selection of images for the purpose validating their right of access or verifying their identity during an authentication challenge by requiring the user to correctly align two or more sets of images that have been presented in a mutually parallel arrangement through a selection mechanism either through a direct one to one matching of the target images, by replacing the positions of one image with another or by having the user apply some other predetermined offset between the images thus allowing the user to make their selections without having to overtly and explicitly expose the specific images they are selecting for the purpose of their authentication through a visibly observable selection point or display coordinate;

d. bolstering the effectiveness an authentication challenge by requiring a user to successively align and thus identify a series of two or more sets of images from a variety of different categories where each progressively successful alignment statistically increases the probability of accurately authenticating an authorized user while reducing the chance of someone arbitrarily guessing the correct succession of images required to gain access or impersonate the identity of another user;

e. increasing the number of successive image alignments that can be required by a particular user during a given authentication session from a limited number of images while also reducing the number of images that must be memorized by the user for the purpose of their authentication by varying the combination in which the selection of different categories of images are paired with each other for presentation and selection by a user from one authentication session to another;

f. reducing the probability of someone arbitrarily guessing or discovering the precise alignment of images required to validate a user's right of access or verify their identification during an authentication challenge by augmenting the selection of images with additional segments of numbered positions, symbols or colors that must be correctly aligned by the user along with the images selected for the purpose of their authentication;

g. obfuscating which specific images are being selected by a user during the administration of an authentication challenge by relying on the plurality of decoy images from two or more categories, as presented in a mutually parallel arrangement through a selection mechanism, that are concurrently aligned along with the images intentionally selected by the user thus making it difficult for an observer or monitoring program to discern which specific images are being chosen by the user for the purpose of their authentication;

h. signaling a user's intent to confirm their selection from two or more distinct categories of images, that have been presented in a mutually parallel arrangement through a selection mechanism during an authentication challenge, by having the user alternately reverse the direction in which the images are aligned in some prescribed manner until a sufficient number of images have been presented and successfully identified to adequately authenticate the user;

i. generating a positional representation of the images selected by a user during an authentication challenge by monitoring the initial alignment of two or more sets of images, as presented in a mutually parallel arrangement through a selection mechanism, and then calculating the offset in alignment between the sets of images after being repositioned by the user in some prescribed manner as the metric for processing and transmitting the user's selection of images for authentication by the system without having to explicitly reference any specific image identifiers or display coordinates.

17. A method for determining the series of images selected by a user for the purpose of validating their right of access or verifying their identification during an authentication challenge by utilizing an arrangement of positions defined in a matrix to track the order in which a corresponding set of images are assigned for presentation to the user through the mutually parallel rows or columns of a selection mechanism and then monitoring the relative offset in alignment between the sets of images after being repositioned by the user in some prescribed manner to calculate the range of positions associated with the images selected by the user thus allowing the authentication system to perform its authentication functions without explicitly referencing, processing, transmitting or storing any specific image identifiers or display coordinates that might otherwise expose the proprietary images chosen by the user for the purpose of their authentication, as comprised of:

a. utilizing an arrangement of positions defined in a matrix to replicate the order in which a corresponding set of images are assigned for presentation to a user through a selection mechanism during the administration of an authentication challenge for the purpose of subsequently determining the positions associated with the images selected by the user for the purpose of their authentication;

b. determining the range of images selected by a user for the purpose of their authentication during an authentication challenge by monitoring the order in which the positions associated with two or more sets of images are initially presented to the user through the rows or columns of a selection mechanism and then utilizing the offset in alignment between one set of images and another after being realigned by the user in some prescribed manner to calculate the positions corresponding to range of images selected by the user;

c. determining the specific images selected by a user for the purpose of their authentication during an authentication challenge by tracking the positions associated with one or more sets of images that have been matched or aligned in some prescribed manner by the user through a selection mechanism and then gradually eliminating the positions that do not register a match over a period of successive presentation/selection cycles to obtain a progressively more accurate distillation of the precise positions associated with the images selected by the user.

18. A method for storing positional representations of the images selected by a user for the purpose of validating their right of access or verifying their identity during an authentication challenge that allows the authentication system to authenticate a user based on the positional information without having to maintain or address any explicit image identifiers, display coordinates, or file designators that could, if otherwise compromised, expose the proprietary images chosen by the user for the purpose of their authentication; as comprised of:

a. storing a formula assigned as part of user's profile during their enrollment for an authentication challenge that specifies the unique arrangement of positional assignments in a matrix that determine the order in which a corresponding set of images are assigned for presentation to the user through a selection mechanism thus allowing the authentication system to subsequently validate a user's right of access or verify their identification based on the representational positions associated with the images selected by the user without maintaining or referencing any image identifiers, display coordinates, or file designators that could, if compromised, reveal the proprietary images chosen by the user the purpose of their authentication;

b. storing an extraction initiator assigned as part of a user's profile during their enrollment for an authentication challenge that instigates a given extraction algorithm to consistently specify the sequence with which a particular set of images are extracted from the file structure where they are stored and assigned to their corresponding positions for presentation to a user through a selection mechanism thus allowing the authentication system to validate a user's right of access or verify their identification based on the representational positions associated with the images selected by the user without maintaining or referencing any image identifiers, display coordinates or file designators that could, if compromised, reveal the proprietary images chosen by the user for the purpose of their authentication;

c. storing positional representations of the images chosen by a user for the purpose of their authentication during an authentication challenge based on the unique order in which the positions associated with a set of images, as defined by their arrangement in a correlated matrix, are assigned for presentation to a given user and the order with which the positions associated with the images are selected by the user in some prescribed manner through a selection mechanism thus allowing the authentication system to validate a user's right of access or verify their identification based on the representational positions without maintaining or referencing any image identifiers, display coordinates, or file designators that could, if compromised, reveal the proprietary images chosen by the user for the purpose of their authentication.

19. A method for verifying whether a user has selected the correct images required to validate their right of access or verify their identification during an authentication challenge by comparing the positions associated with the images initially selected by the user during an enrollment process, as defined by the order in which their corresponding positions are arranged in a correlated matrix, with the positions associated with the images selected by the user in a subsequent authentication session thus allowing the authentication system to authenticate the user based on a comparative evaluation of the representational positions associated with the images rather than through the explicit referencing of any specific image identifiers or display coordinates that, if compromised, could otherwise reveal the proprietary images chosen by the user for the purpose of their authentication, as comprised of:

a. retrieving the positions associated with the images selected by a user during their initial enrollment for an authentication challenge from a database where the positions are stored as a part of the user's profile and then mapping the positions to their corresponding coordinates in an array where they can subsequently be compared against the positions associated with the images selected by the user during a subsequent authentication session;

b. mapping the positions associated with the images selected by a user for the purpose of their authentication during a currently active authentication challenge to their corresponding coordinates in an array where they can subsequently be compared with the positions associated with the images initially chosen by the user during their enrollment;

c. facilitating a comparison between the positions associated with the images chosen by a user during their enrollment with the positions associated with the images selected by the user during a currently active authentication challenge by utilizing a comparator mechanism to analyze all possible positions in an array to determine whether a correct match is corroborated or not;

d. authenticating a user based on the statistically adequate matching of a subscribed number of images over a prescribed number of presentation/selection cycles to infer that the remaining matched positions reflect a viable subset of the images that have been selected by the user for the purpose of their authentication;

e. instigating additional presentation/selection cycles up to a given limit for the purpose of giving a user additional chances to validate their authentication;

f. signaling and conveying an acceptance or denial notification that can be passed along by the authentication system to either grant or deny access.

* * * * *